United States Patent [19]

Rudd

[11] 4,192,984

[45] Mar. 11, 1980

[54] EMBEDMENT OF HARD PARTICLES IN A METAL SURFACE

[75] Inventor: Wallace C. Rudd, New Canaan, Conn.

[73] Assignee: Thermatool Corporation, Stamford, Mass.

[21] Appl. No.: 923,777

[22] Filed: Jul. 12, 1978

[51] Int. Cl.² .......................... B23K 9/04; B23K 11/00
[52] U.S. Cl. ................................... 219/76.17; 219/9.5
[58] Field of Search ................. 219/76.1, 76.11, 76.17, 219/9.5, 77; 427/199, 376 B, 376 D

[56] References Cited

U.S. PATENT DOCUMENTS

| 2,164,310 | 7/1939  | Deneen et al.  | 219/10.41 X |
| 2,258,894 | 10/1941 | Janco          | 219/9.5 X   |
| 2,318,263 | 5/1943  | Smith, Jr.     | 219/77      |
| 2,857,503 | 10/1958 | Rudd et al.    | 219/67 X    |
| 3,101,400 | 8/1963  | Gagliardi      | 219/10.43   |
| 3,267,252 | 8/1966  | Morris         | 219/7.5 X   |
| 3,497,662 | 2/1970  | Rudd et al.    | 219/104 X   |
| 3,591,757 | 7/1971  | Rudd           | 219/67      |
| 3,860,778 | 1/1975  | Rudd et al.    | 219/67      |
| 3,872,275 | 3/1975  | Rudd           | 219/10.43   |
| 4,039,700 | 8/1977  | Sohmer et al.  | 219/9.5 X   |

FOREIGN PATENT DOCUMENTS 4,834,487  10/1973  Japan ................................. 219/137 R Primary Examiner—B. A. Reynolds
Assistant Examiner—Keith E. George
Attorney, Agent, or Firm—Brooks, Haidt, Haffner & Delahunty

[57] ABSTRACT

A method and apparatus for embedding in a surface area of a metal part a plurality of particles of a material having a melting point higher than, and mechanical properties different from, the metal of the part. The metal part is contacted with a pair of contacts, one at each end of the area, and electric current having a frequency of at least 3000 Hz is supplied to the contacts through a proximity conductor or conductors which overlies or overlie the area and which are spaced from the area by not more than five times the conductor width. The current is maintained until the metal of the area reaches a temperature at least equal to the melting temperature thereof and the particles are inserted into the molten metal which is then cooled. If the temperature of the molten metal exceeds the melting temperature of the particles, the molten metal is cooled before the particles completely melt.

34 Claims, 21 Drawing Figures

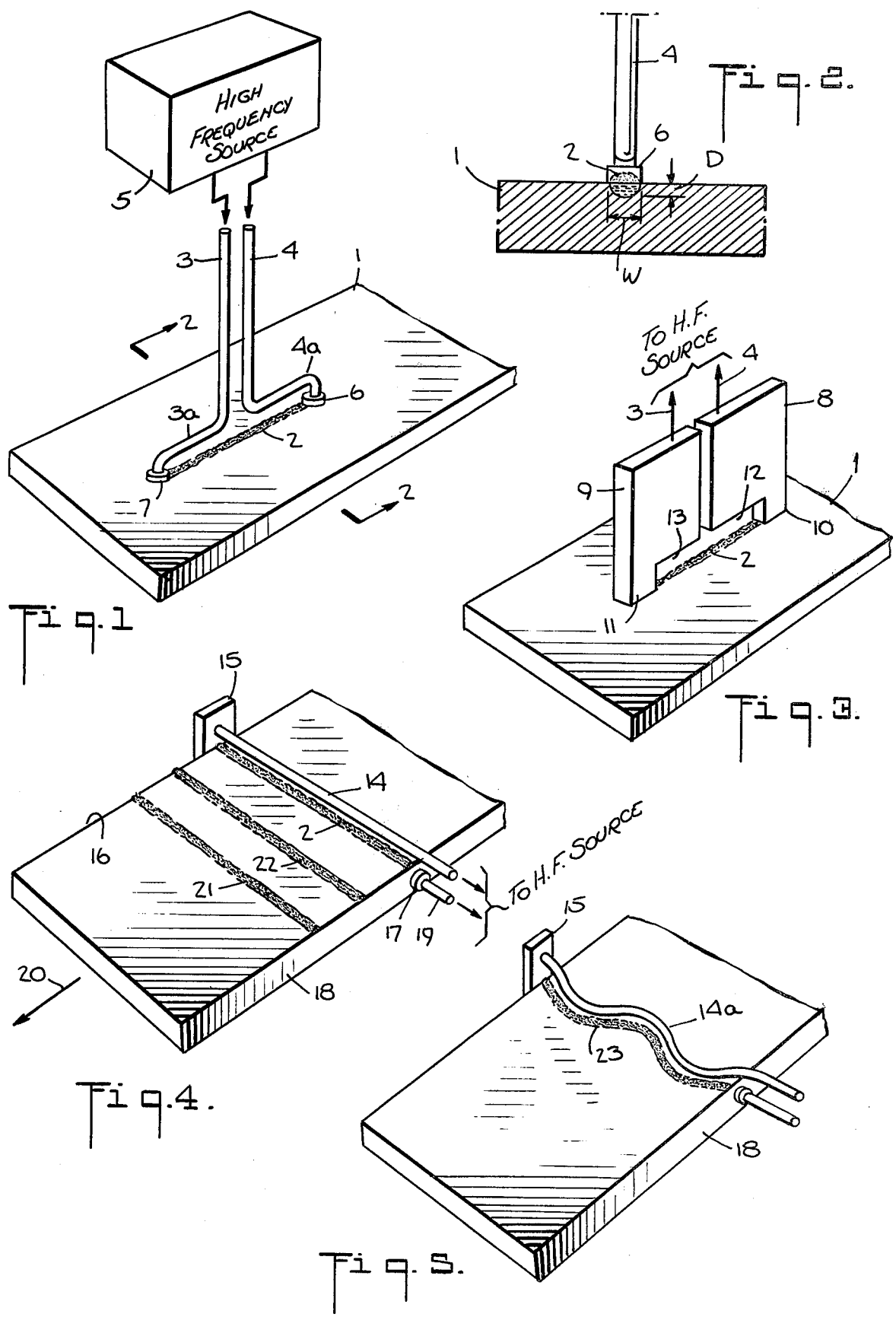

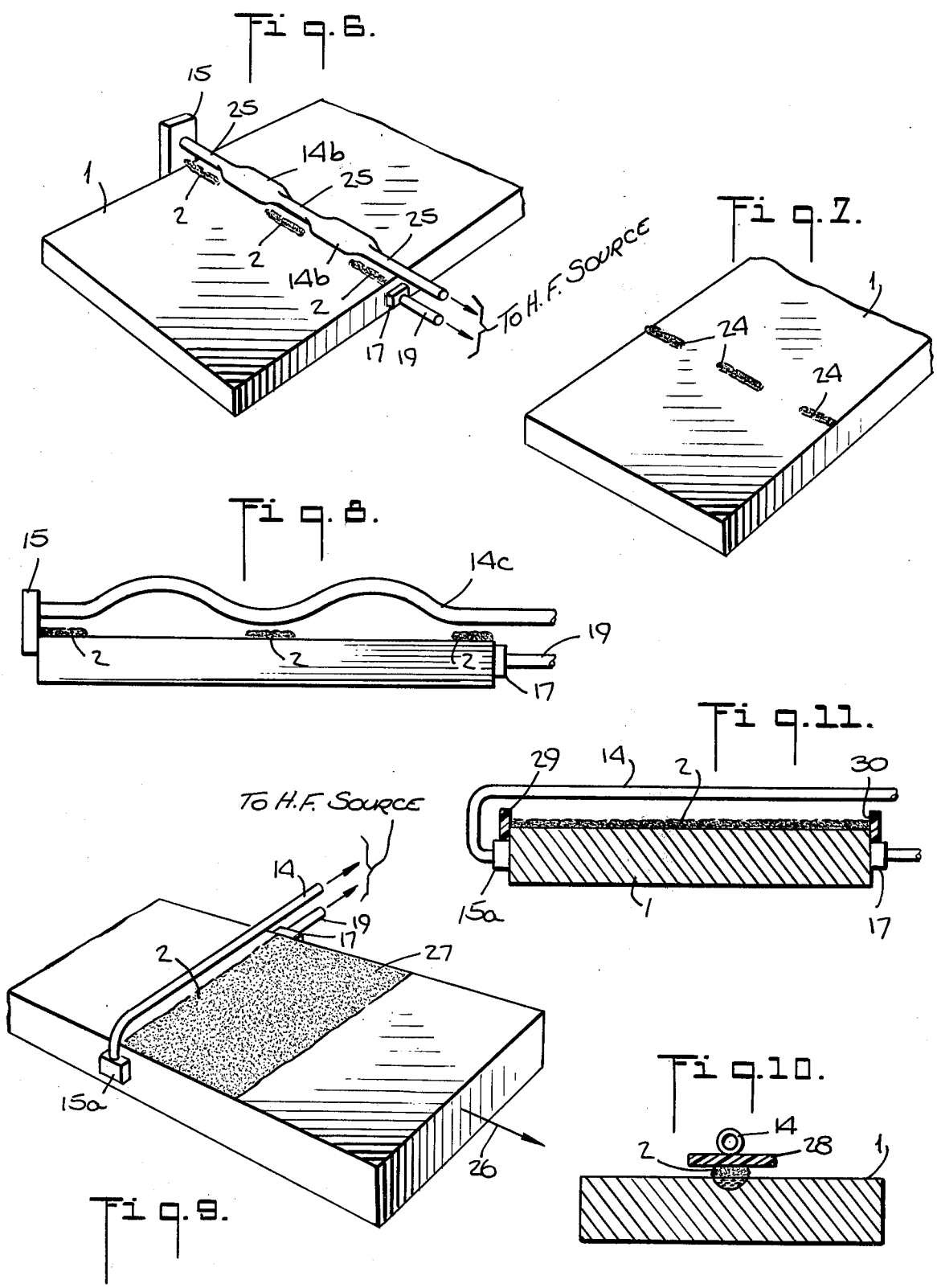

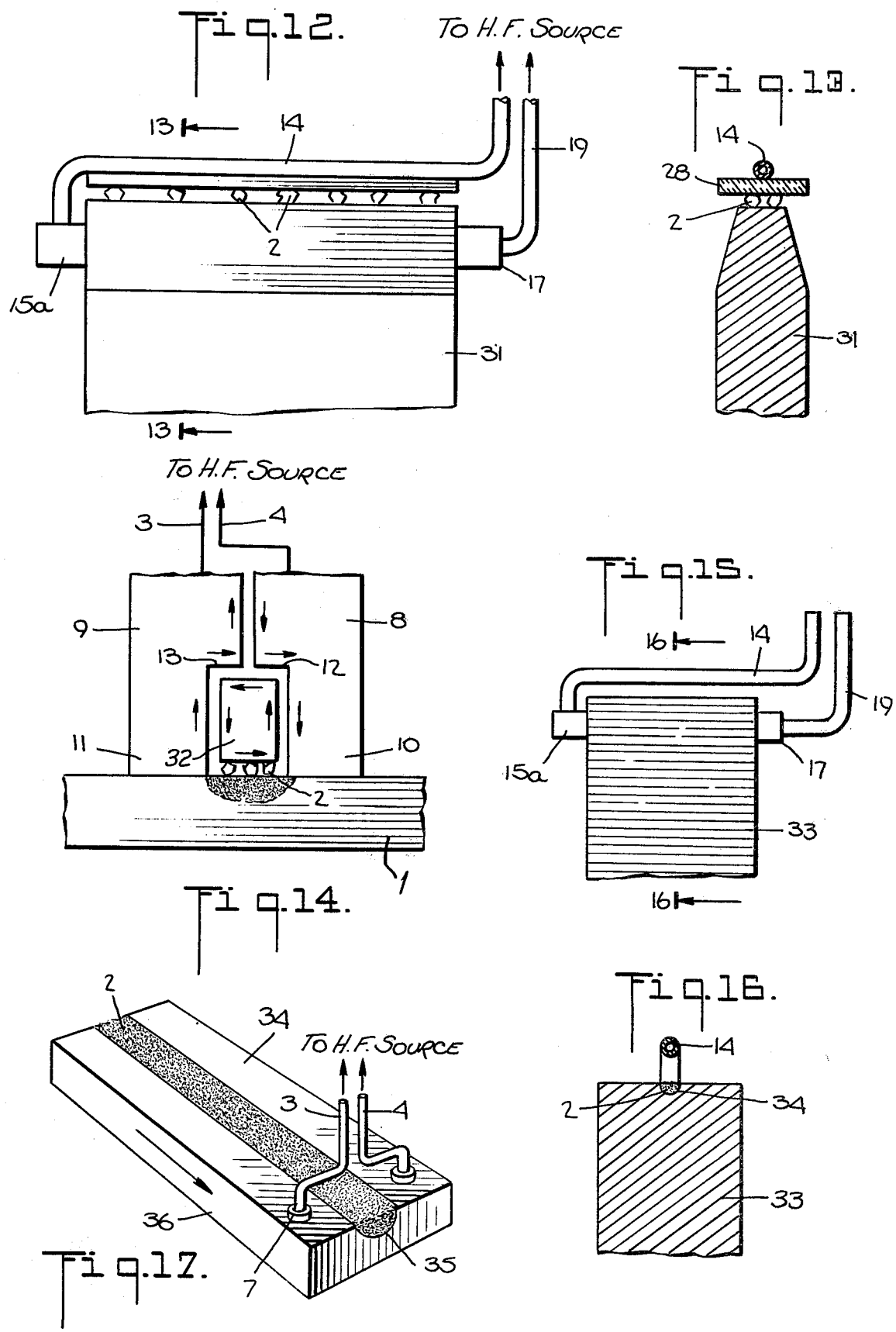

EMBEDMENT OF HARD PARTICLES IN A METAL SURFACE

This invention relates to a process and apparatus for modifying the surface properties of metals employing electrical heating of the metal at its surface to raise its temperature to the melting point thereof with embedment of hard particles in the molten metal.

It is known in the art to provide metal parts with surfaces which have better wearing or cutting properties than the underlying metal by providing harder material, e.g. tungsten carbide, at such surfaces, the harder material being bonded to or embedded in the underlying metal. Various methods have been used to heat the underlying metal to the temperature necessary to permit embedment of the particles therein. However, with the prior art methods, it has been difficult, if not impossible, to limit the heating to narrow areas and small depths or to accomplish the heating in very short times.

It is known in the art that high concentrations of electric current in a metal part can be produced by contacting the metal part with a pair of contacts, one at one end of the desired path and one at the other end of such path, and connecting the contacts to a high frequency current source, at least one of the contacts being connected to the source through a conductor, known as a proximity conductor, which extends from adjacent one contact to the other contact and which is closely adjacent to and follows the desired current path. See, for example, U.S. Pat. Nos. 2,857,503; 3,591,757 and 3,860,778. From the latter patent, it is known to melt portions of the metal of a pair of contacting metal parts for forming a weld therebetween and to add filler metal in the form of wire, powder or chips to the molten metal. In such patent, it is contemplated that the added metal be the same as, or similar to, the metal of the parts being welded together and that the added metal be rendered molten so as to fill any gaps, depressions or crevices which may result from the melting of the parts. It is also known from U.S. Pat. No. 3,497,662 to add filler metal in the form of a foil, wire or rod at the joint between two metal parts being welded together using such apparatus and methods. However, the metal of the filler metal is the same as, or similar to, the metal of the metal parts and is longitudinally continuous as far as electrical conductivity is concerned, and the metal of the parts is not melted. As far as I am aware, such apparatus has never been used, or suggested for use, in the embedment of particles of a material in a metal part, such particles having a higher melting point and properties different from the metal of the part and being of a relatively poor electrical conductivity as compared to the metal part.

One object of the invention is to provide a method of embedding, in the surface of a metal part, particles of a material which is harder or longer wearing than the metal of the part.

In accordance with one embodiment of the invention, power densities of 125 kilowatts per square inch and higher are produced along a path in a metal part by supplying electric current to such path by means of contacts, one at each end of the path, by suitably selecting the current frequency and magnitude so that a large current effectively penetrates the metal only a very small amount and by feeding the current to at least one of the contacts through a proximity conductor properly located and of the proper size. After the metal is so heated until it melts along said path, particles of a material which are harder and/or have better wearing properties, herein called better mechanical properties, than the metal of the part are deposited on or pressed into the molten metal which is then cooled or permitted to cool.

Other objects and advantages of the present invention will be apparent from the following detailed description of the presently preferred embodiments thereof, which description should be considered in conjunction with the accompanying drawings in which:

FIG. 1 is a schematic, perspective view of apparatus for heating a metal part to its melting point along a line, and embedding particles therein;

FIG. 2 is a cross-sectional view of the embodiment shown in FIG. 1 and is taken along the line 2—2 indicated in FIG. 1;

FIG. 3 is similar to FIG. 1, but illustrates a modified form of apparatus;

FIG. 4 is a schematic, perspective view illustrating a further modified form of apparatus and the heating to their melting points of a plurality of lines of metal on the surface of a metal part and embedding particles therein;

FIG. 5 is similar to FIG. 4 but illustrates a sinuous proximity conductor;

FIG. 6 is similar to FIG. 4, but illustrates a proximity conductor of varying cross-section for producing a series of aligned lines of molten metal on the surface of a metal part and embedding particles therein;

FIG. 7 illustrates the lines of particles embedded in metal obtained with the apparatus shown in FIG. 6;

FIG. 8 is a side elevation view of a proximity conductor which has a varying spacing with respect to a metal part for producing results similar to those shown in FIG. 7;

FIG. 9 is similar to FIG. 4, but illustrates the embedding of particles in a wider area of the surface of a metal part;

FIG. 10 is a cross-sectional, and elevation view illustrating the use of a plate or bar to confine the metal being heated and/or to press the particles in the metal;

FIG. 11 is a cross-sectional, side elevation view illustrating the use of plates or bars at the ends of a line of metal being heated to prevent loss of metal;

FIGS. 12 and 13 are, respectively, side elevation and cross-sectional views of apparatus for embedding particles in the end of a tool, FIG. 13 being taken along the line 13—13 indicated in FIG. 12;

FIG. 14 is a side elevation view of a modification of the embodiment shown in FIG. 3;

FIGS. 15 and 16 are, respectively, side elevation and cross-sectional views of apparatus for embedding particles in the end of a bar, FIG. 16 being taken along the line 16—16 indicated in 15;

FIG. 17 is a persepective view of apparatus for producing a relatively long line of metal with particles embedded therein;

Figure 18:
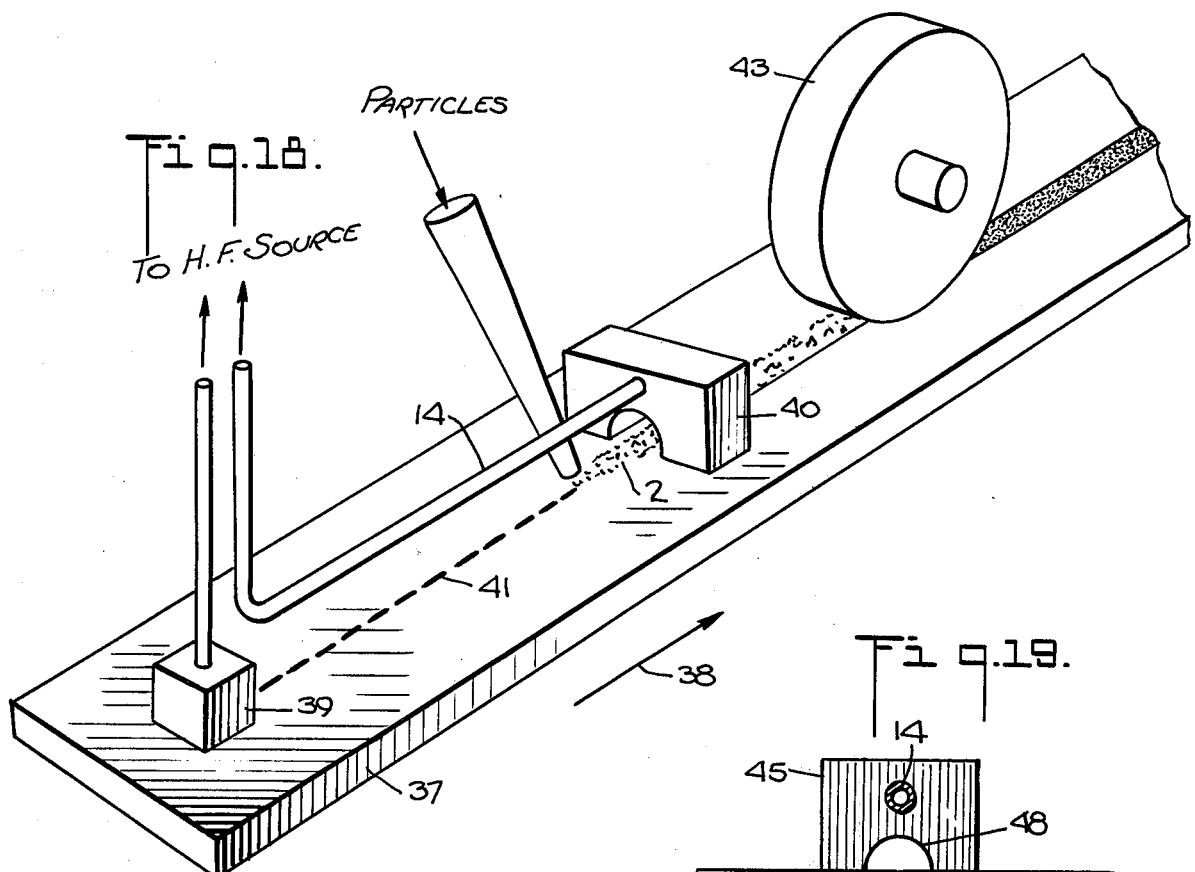
FIG. 18 is a perspective view of further apparatus for producing a relatively long line of metal with particles embedded therein.

For a better understanding of the invention, it is desirable to call attention to certain phenomena associated with metal heating by electric currents. Thus, the heat developed is proportional to the square of the current times the effective resistance of the path through which the current flows. The effective path of the current depends upon the skin effect, i.e., the increased current density at the surface of the part, the proximity effect, i.e., the tendency of the current in the part to flow as near as possible to a conductor, e.g. a proximity conductor, carrying oppositely flowing current, and the reference depth, i.e., the equivalent depth assuming (even though it is not the case) a uniform current distribution to such depth, which is defined by the formula:

$$d \text{ in inches} = 3160\sqrt{p/uf}$$

where p is the resistivity of the metal in ohm inches, u is the relative magnetic permeability and f is the frequency in cycles per second. It will be noted that reference depth decreases with increases in frequency, which, in turn, means that the effective resistance increases with frequency. Since reference depth is also dependent upon permeability, and since magnetic materials such as steel lose their magnetic properties above a certain temperature (Curie point), it will be apparent that the reference depth for such materials progressively increases as they are heated.

The reference depth of current in a metal is determined from the formula set forth hereinbefore, and it is sometimes referred to as the depth in which 86% of the heat is developed and within which about 86% of the current flows. Typical reference depths, in inches, in various metals at 70° F., are as follows:

| Material | Frequency - Kilohertz | | | | |
|---|---|---|---|---|---|
| | 0.06 | 3 | 10 | 100 | 400 |
| Steel* | 0.041 | 0.0066 | 0.0002 | 0.00059 | 0.0003 |
| Aluminum | 0.430 | 0.110 | 0.053 | 0.010 | 0.005 |
| Brass | 0.640 | 0.150 | 0.050 | 0.016 | 0.008 |
| Copper | 0.336 | 0.085 | 0.026 | 0.008 | 0.005 |

*Below Curie Point; for non-magnetic steel or magnetic steel above Curie Point multiply by 100 for approximate value.

Proximity effect is also dependent both on current frequency and the spacing between the paths carrying oppositely flowing currents. At current frequencies below about 3000 hertz, proximity effect is relatively small, but proximity effect becomes significant at 3000 hertz or higher and becomes increasingly important at 50 kilohertz and higher. At spacings between the centers of round conductors of the order of five or more times the conductor diameters, the effect is relatively small, but with spacings less than twice the diameters, the effect is signifcant. Similar effects are present with conductors of other shapes. Thus, in order to be effective for the purposes of the invention, the heating current frequency must be at least 3000 hertz and preferably is at least 50 kilohertz and the spacing between the proximity conductor and the faces of the metal portion to be heated should be less than five times the width of the proximity conductor.

The width of current path in the part is also influenced by the use of magnetic pieces at the sides of the current path and by the shape and spacing of the proximity conductor carrying oppositely flowing current, the latter being described and illustrated in FIGS. 7-10 in my copending application Ser. No. 901,360, filed May 1, 1978, and entitled "High Frequency Induction Welding With Return Current Paths on Surfaces to be Heated". Thus, by increasing the spacing between the proximity conductor and the metal to be heated, the width of the current path is increased, and by increasing the width of the proximity conductor in a direction parallel to the width of the current path, the width of the current path is increased.

At high frequencies the path of the major portion of the current is determined mainly by the reactance of the path rather than by the resistance thereof, and therefore, the major portion of the current may not follow the shortest path between two points of different potential. Since the proximity conductor decreases the reactance of the current path thereadjacent, the principal current path may be made to be a path adjacent the proximity conductor even if such path is not the physically shortest path.

Of course, heat is transferred to the portions of the part outside the path of current by conduction flow at a rate dependent upon the thermal conductivity of the metal, but by rapidly heating the metal in the major current path to a high temperature and then discontinuing the current flow, the temperature of such portions may be kept low as compared to that of the current carrying metal.

For all thse reasons, the path of current flow and its effective dimensions, the heating and temperature obtained and the localization of the heating are dependent upon many factors including the presence or absence of a proximity conductor, the shape and location of the proximity conductor with respect to the part to be heated, the time duration of current flow, the electrical and thermal characteristics of the metal, the configuration of the part being heated, the presence or absence of magnetic material adjacent the current path, etc. In accordance with the invention, use is made of such phenomena to provide a restricted and rapid heating of the metal to be treated and to heat a portion of such parts to its melting temperature without raising the temperature of the metal spaced a short distance from such portion, either to the side or below thereof, to melting temperature.

The basic principles of the invention are illustrated in FIGS. 1 and 2. Such figures show a metal part 1 which is to be melted along the path underlying the pile of particles 2 for the purpose of embedding the particles 2 in the surface of the part 1. High frequency current is caused to flow along such path by means of a pair of conductors 3 and 4 connected at one end to a source 5 of high frequency current and connected at their opposite ends respectively to the opposite ends of the path through a pair of contacts 6 and 7.

The leads 3 and 4 have a pair of horizontal portions 3a and 4a which extend substantially parallel, and in closely spaced relation, to the upper surface of the metal part 1. It will be noted that the currents in the portions 3a and 4a are flowing oppositely to the current in the adjacent path in the metal part 1 at any given instant of time, and therefore, the portions 3a and 4a act as proximity conductor means for concentrating the current at the path under the particles 2. Such path is the physically shortest path between the contacts 6 and 7, and while most of the current would flow along such path in the absence of the portions 3a and 4a, the width of the current path would be greater in the direction parallel to the upper surface of the part 1 and perpendicular to a line between the contacts 6 and 7. With the proximity means 3a and 4a, the width of the current path is approximately equal to the diameter, and hence the width of the portions 3a and 4a.

In FIG. 2, the cross-section of the current path underlying the particles 2 is indicated by the shaded area, and the depth D is the reference depth or the depth within which about 86% of the current flows and about 86% of the heat is developed. Thus, by suitably selecting the frequency of the current in relation to the metal of the part 1, the depth of the rapidly heated metal can be controlled.

As mentioned hereinbefore, the width W of the cross-section of the path underlying the particles 2 can be controlled by the spacing of the portions 3a and 4a with respect to the upper surface of the part 1, and the width and shape of the portions 3a and 4a. Thus, by keeping the spacing between the portions 3a and 4a and the upper surface of the part 1 less than five times, and preferably, two times or less, than the cross-sectional width of the portions 3a and 4a, there is significant proximity effect, and the less the spacing, the smaller the width W will be. Similarly, by keeping the cross-sectional width of the portions 3a and 4a small, consistent with the current carrying and heat dissipation requirements, the width W is kept small, the narrower the width of the portions 3a and 4a, the smaller the width W. The portions 3a and 4a may, for example, be copper tubing of 3/16 or ¼ inch outside diameter which is internally water cooled, the water being under high pressure.

Accordingly, by selecting the frequency of the heating current and the width of the portions 3a and 4a (proximity conductors) and their spacing with respect to the upper surface of the part 1, rapid heating of a very narrow and shallow volume of metal along the path underlying the particles 2 can be accomplished. It is practical to obtain a heating power density in the current path 1 of 125 kilowatts per square inch and higher and to heat metal to melting temperature along paths of various lengths in less than three seconds, without melting metal outside such paths, examples of the path width and depth being, respectively, 0.080 inches or less and 0.020 inches or less. Of course, if desired, the paths can be made wider and deeper using the principles discussed hereinbefore, i.e. selection of frequency, and proximity conductor size and spacing, and selection of the time of current flow and the current magnitude, but care must be taken to concentrate the current and its duration so that the metal does not melt through and so that a large area is not heated by conduction of the heat through the metal adjoining the current path.

After the metal of the path underlying the particles 2 has become molten, the particles which are loosely piled thereon will sink into the molten metal and become embedded therein provided that the density thereof is high enough. If it is not, the particles 2 may be pressed into the molten metal as described hereinafter.

Generally speaking, the particles 2 will be loosely packed and the pile of particles will have a low electrical conductivity along its length so that there will be only relatively little heating of the particles 2 by the currents. Preferably, the size of the particles is in the range from 50 to 300 mesh, but they may be as large as 0.1 inches in cross-section.

Also, generally speaking, the particles 2 will be of a material which has a melting point higher than the melting point of the metal of the part 1 and will have mechanical properties, e.g. hardness or wear properties, better than those of the metal of the part 1. However, with respect to the melting point, the surfaces of the particles 2 may melt and form an alloy with the metal of the part 1 at temperatures reached when such metal is melted, the particles 2, in such case, not only being embedded in the metal of the part 1, but also being bonded to the part 1 by an alloy of the particles 2 and the metal. This has been found to be true even if the melting temperature of the particles is much higher than the melting temperature of the metal of the part 1. On the other hand, the object of the invention is not to cause the particles to melt completely and disappear, and therefore, the heating and cooling of the metal of the part 1 is controlled so that most of the particles remain intact when the molten metal is cooled. Thus, if desired, the metal of the part 1 is heated to at least its melting temperature but to a temperature below that at which the particles 2 will melt significantly and then, the molten metal is cooled, or, alternatively, the metal of the part 1 is heated to a temperature above its melting temperature and the melting temperature of at least portions of the particles 2 but the molten metal is cooled before the particles 2 completely melt. In both cases, at least most of the discrete particles 2 which were added to the molten metal will still exist, and be embedded in the metal at or near its surface, after the metal is cooled.

With respect to the mechanical properties of the particles 2, the invention will be useful mainly when it is desired to improve the surface properties of the metal part 1. However, there may be cases when it is desired merely to provide lines of embedded particles of a material having properties which are only mechanically different from those of the metal of the part 1.

Examples of particle materials which may be used with various metal parts 1 are as follows:

| Metal of Part 1 | Particles 2 |
| --- | --- |
| steel | tungsten |
| Steel | tungsten carbide |
| steel | tungsten carbide with cobalt matrix |
| steel | alumina |
| steel | silicon nitride |
| steel | diamond bort |
| steel | boron or silicon carbide |
| lead | iron |
| silicon | aluminum |
| nickel | boron carbide |
| copper | alumina |
| aluminum | silicon nitride |
| bronze | diamond bort |

In some cases, the material of the particles 2 may rapidly oxidize at the temperature of the molten metal, and if this is undesirable, the melting of the metal may take place in an inert atmosphere, such as an atmosphere of argon or nitrogen, or in a reducing atmosphere, e.g. of hydrogen, the inert gas or the reducing gas surrounding the particles 2 as the metal is melted.

If the metal of the part 1 does not "wet" the particles 2, the latter will be held in place by mechanical interlocking of the particles 2 and the metal. Preferably, to provide a better connection between the particles 2 and the metal, conventional fluxes and atmospheres may be employed to improve the wetting of the particles 2 by the molten metal.

If the metal of the part 1 is a metal which is hardenable by heating and quenching, as is described in the co-pending application of Rudd and Udall, Ser. No. 923,776 filed July 12, 1978 and entitled "Surface Hardening of Metals Using Electric Currents", the metal which has been melted may harden by self-quenching due to the fact that only a narrow area is rendered molten. In such case, the particles 2 will be embedded in metal of the part 1 which is harder than the adjacent metal.

An alternative form of the embodiment shown in FIGS. 1 and 2 is illustrated in FIG. 3. The embodiment illustrated in FIG. 3 operates in the same manner as the embodiment shown in FIGS. 1 and 2, but the functions of the portions 3a and 4a and the contacts 6 and 7, shown in FIG. 1, are performed by a pair of shaped metal blocks 8 and 9, e.g., made of copper, connected by suitable leads to the high frequency source and water cooled in any conventional way.

Thus, the blocks 8 and 9 have portions 10 and 11 which conductively contact the upper surface of the part 1 and have portions 12 and 13 which act as proximity conductor means, the current being concentrated at the adjacent faces of the blocks 8 and 9 due to the proximity effect. The portions 12 and 13, like the portions 3a and 4a, cause the current in the part 1 to be concentrated in a narrow path at the upper surface of the part 1 and underlying the particles 2.

To embed the particles 2 in the metal part 1, the desired width, depth, and length of the area in which the particles 2 are to be embedded are determined and then, the frequency of the current is selected to provide a reference depth somewhat greater than the depth of the metal to be rendered molten. The contacts 6 and 7, or the contact portions 10 and 11 may be relatively small, e.g., ¼ to ½ inch in diameter or on a side, and the proximity conductors, 3a and 4a or 12 and 13, are made with a size, shape and length and a spacing with respect to the surface of the part 1 to provide the desired width and length of the metal under the particles 2 to be melted, bearing in mind that the proximity conductors must carry hundreds of amperes. The spacing between the proximity conductors and the surface of the part 1 may be relatively small and preferably, the spacing is about two times the proximity conductor width, or less. The high frequency current is then supplied to the contacts through the proximity conductors, and the magnitude and duration thereof required to provide the desired heating of the metal of the part 1 is determined by test. Generally speaking, the duration of the current flow will be relatively short, e.g., less than three seconds in order to avoid significant heating of metal outside the desired path due to thermal conduction.

Due to the current distribution in the current path underlying the particles 2, the current being the highest at the surface and decreasing rapidly as the depth increases, the surface temperature will rise faster than the temperature of the metal below the surface. In addition, when the current first flows in a magnetic material, such as steel, the reference depth is small, whereas when the temperature rises above the Curie point, such as at temperatures in excess of 1550° F., the reference depth may increase by about 100 times. Accordingly, the effective resistance, and the heating current depth, varies as heating ensues.

To vary the depth of heating and hence, melting, it may be desirable to vary the magnitude of the current in the current path during the heating cycle. For example, it may be desirable to have a large magnitude current at the beginning of the heating cycle and then, to reduce the current as the surface metal reaches its melting temperature thereby permitting the metal below the surface to melt by thermal conduction and current heating. Similarly, the depth of heating to melting temperature may be made greater, and may be greater than the reference depth, by increasing the length of the heating cycle and varying the current magnitude to produce the desired temperature distribution. Thus, the current magnitude may be largest at the beginning or the end of the heating cycle or be varied in other manners to produce the desired temperature distribution in the current path underlying the particles 2 bearing in mind, however, that for self-quenching of the metal of the part 1, the heating must be very rapid in order that the quenching will be rapid and that to avoid melting of metal which does not underlie the particles 2, the heating must also be very rapid.

FIG. 4 illustrates the use of the invention to produce a line, or lines of melted and then cooled metal with particles 2 embedded therein on the surface of a metal part 1. In FIG. 4, a proximity conductor 14 extends over the path 2 where the metal is to be melted and is connected at its end to a contact 15 which engages a side 16 of the part 1. Another contact 17 engages the opposite side 18 of the part 1 and is connected to the high frequency current source by a lead 19. The spacing between the conductor 14 and the upper surface of the part 1 may, for example, be from 1/16 to 3/16 inches. When current is supplied to the part 1 by way of the proximity conductor 14, the lead 19 and the contacts 15 and 17, metal along the path underlying the particles 2 is heated to its melting temperature.

After each melted and cooled line of metal is produced, the part 1 may be moved with respect to the contacts 15 and 17 in the direction of the arrow 20 to produce a series of spaced lines of metal with particles 2 embedded therein, shaded areas 21 and 22 in FIG. 4 representing lines of previously treated metal.

Because of the use of the proximity conductor, the line of melting and embedment of the particles 2 need not be straight or continuous. For example, to produce a wavy line 23 the proximity conductor may be shaped in the form of the proximity conductor 14a shown in FIG. 5. Because of the proximity effect, the current will concentrate below the proximity conductor 14a, and its path will conform to the shape of the conductor 14a.

Similarly, by varying the width of the proximity conductor or its spacing with respect to the surface of the part 1, the current concentration, and the heating, below the proximity conductor may be varied to produce spaced, melted metal areas. FIG. 6 illustrates a proximity conductor 14b of varying width, and FIG. 7 shows the metal pattern segments 24 having particles 2 therein, the melting occurring below the narrower width portions 25 of the conductor 14b because of the greater current concentration.

Segments of metal with particles 2 therein similar to the pattern segments 24 shown in FIG. 7 can also be obtained with the proximity conductor 14c shown in FIG. 8 which has a variable spacing with respect to the part 1, the current being more highly concentrated below the portions of the conductor 14c nearer the surface of the metal part 1.

An alternative method for producing the pattern illustrated in FIG. 7 is to use the apparatus illustrated in FIG. 4 but to provide areas of metal having an electrical conductivity significantly higher than the electrical conductivity of the metal of the part 1 where melting is not desired. For example, if the metal of part 1 is steel, a line of copper plating may be provided where the current path is to be and portions thereof corresponding to the segments 24 are ground off prior to applying current to the part 1 along the path 2. In this way, because of the lower losses in the copper, the heating intermediate the segments 24 will be less. Of course, instead of applying a continuous line of copper and then grinding off the portions thereof corresponding to the segments 24, the copper may be applied to the part 1 by known techniques only where less heating is desired.

If it is desired to produce a substantially continuous area of metal with particles 2 which is wider than the lines 21 and 22 (FIG. 4), the part 1 may be moved continuously or stepwise in small increments in a direction parallel to the surface of the part 1 being treated and perpendicular to the length of the current path as illustrated in FIG. 9. As illustrated in FIG. 9, the part 1 may be moved in the direction of the arrow 26 to produce a relatively large area 27 of melted and then cooled metal with the particles 2 therein at the upper surface of the part 1.

Because the magnitude of the currents used in the method of the invention, the metal being treated is subjected to relatively large magnetic fields tending to displace the metal being melted, particularly with non-magnetic metals. The magnetic fields may be of sufficient magnitude to "blow" the molten metal away from its normal position. To avoid such removal of the molten metal and/or to hold the particles 2 in place while the metal therebelow is melted, the area being heated may be covered by a bar or slab 28 of high temperature resistant, insulating material, such as silicon nitride, as illustrated in FIG. 10. As the metal melts, or after it melts, the bar 28 may be pressed downwardly to force the particles into the molten metal. The application of pressure to the particles 2 will lower the electrical resistance thereof, and if pressure is applied during the time the current is flowing, more current will flow through the particles 2 increasing the heating thereof.

Similarly, if the line or area of metal being melted extends from one side to the other side of the part 1 so that molten metal can drip or distort at the ends of the line, dams 29 and 30 of high temperature resistant, insulating material may be held against the sides of the part 1, as illustrated in FIG. 11, to hold the molten metal in place. Of course, such dams 29 and 30 may be used with a slab 28 or be extensions of the latter.

Although the molten metal may be merely permitted to cool after the particles 2 are embedded therein, cooling may be assisted by directing a cooling gas or liquid on the heated metal or adjacent thereto. If desired, cooling may be hastened by chilling the metal part before applying the heating current.

The embodiment shown in FIG. 10 may be used as shown in FIGS. 12 and 13 to improve the wearing properties of the edge of a steel tool 31. Thus, as shown therein, in FIGS. 12 and 13 the particles 2 are held against the edge face of the tool 31 by the bar 28. Electrical current having a frequency of at least 3,000 Hz is supplied to the contacts 15a and 17, which engage the tool 31 at its side faces, through the proximity conductor 14 and the conductor 19, and the current is maintained until the surface of the edge face melts and the particles 2 are pressed into the molten metal by the bar 28. Thereafter, the edge face is cooled, and the resulting edge face is composed of particles 2 embedded in a matrix of the metal of the tool 31.

The embodiment shown in FIG. 3 may be modified as shown in FIG. 14 to include a bar 32 for holding the particles 2 in place and/or pressing them into the molten metal of the part 1. If the bar 32 is made of a low electrical conducting material, such as silicon nitride, it should have a relatively small vertical dimension, as viewed in FIG. 14, so that the portions 12 and 13 may be spaced from the surface to be melted by not more than five times the width (in the direction perpendicular to the plane of the paper) of the portions 12 and 13. However, it may extend beyond the width of the portions 12 and 13.

If the bar 32 is made of a material having a good electrical conductivity, such as copper, electrical currents will be induced therein which have flows, relative to the current flows in the blocks 8 and 9 and the part 1 as indicated by the arrows shown in FIG. 14. Thus, the bar 32 will act like a proximity conductor, and the width of its lower face should be relatively small to keep the current path in the part 1 relatively narrow.

In the various embodiments described herein, the particles 2 may also be forced into the molten metal in other ways. For example, after the metal is molten, the particles may be projected against the molten metal through a tube at a relatively high velocity in known ways or the particles may then be applied to the surface of the molten metal and then pressed therein such as by means of a paddle or a roller.

A test of the invention was conducted using the embodiment illustrated in FIGS. 15 and 16. A metal bar 33 of mild steel and 1¼ inches square at its ends was machined at its end to provide a small groove 34 therein having a radius of about 1/32 inch. The groove 34 was filled with 99.5% pure tungsten particles 2 having a particle size in the range from −30 to 30 100 mesh. Non-conductive tape was applied over the particles and secured to the bar 33 to hold the particles 2 in place. The melting temperature of the steel was about 2700° F., and the melting temperature of the tungsten was about 6170° F. Current from a 160 kilowatt generator operating at 400 kHz was supplied to the contacts 15a and 17 through the proximity conductor 14 and the conductor 19 for approximately 0.56 seconds. There was greater melting of the metal at the ends of the groove 34 for reasons explained in connection with FIG. 19. Melting also occurred along one edge of the groove 34, for the full length thereof, rather than across the full width thereof because the proximity conductor 14 was not exactly above the center line of the groove 34. However, the tungsten particles mixed with the metal where it was molten, and after the molten metal cooled, it was found that the tungsten particles were securely embedded in the metal of the bar 33, and examination of such metal-particle portions of the bar 33 with an optical microscope showed that the tungsten particles were held in place by a tungsten-iron alloy at their surfaces.

A further embodiment of the invention for obtaining a relatively long line of metal with embedded particles is illustrated in FIG. 17. In this figure, a bar 34 having a groove 35 at its upper surface is filled with particles 2, either before or during heating, and current is supplied to the contacts 6 and 7 through the conductors 3 and 4. As the metal at the surface of the groove 35 melts between the contacts 6 and 7 and the particles 2 become embedded in the molten metal, the bar 34 is moved in the direction of the arrow 36 at a rate such that a continuous surface area of particles 2 embedded in the metal of the surface of the groove 35 is obtained. If desired, or if found to be necessary, the particles 2 may be pressed into the molten metal by a tapered paddle of silicon nitride which fits at least partly into the groove 35 and which is positioned adjacent and downstream of the contacts 6 and 7.

A further embodiment for obtaining a relatively long line of metal with embedded particles is illustrated schematically in FIG. 18. In this figure, a bar 37 is continuously moved in the direction of the arrow 38 and current is supplied to the contacts 39 and 40 by way of the conductor 19 and the proximity conductor 14. The principal currents follow the path 41 on the surface of the bar 37 and heat the metal along such path 41 so that by the time it reaches the contact 40, or thereunder, it is molten. Particles 2 are fed to the heated metal in advance of the contact 40 through a tube 42 of insulating material. Downstream of the contact 40, the particles 2 are pressed into the molten metal by a roller 43 supported in any desired manner so that it is urged toward the surface of the bar 37 and presses the particles 2 into the molten metal. If desired, the particles 2 could be fed to the molten metal immediately downstream of the contact 40 and upstream of the roller 43.

It may be found that when the contacts are placed at the edges of a metal part, such as in the embodiments shown in FIGS. 4-13 and 15 and 16, the metal at the edges melts and falls or moves away from the edges or there is excess melting at the edges due to the position of the edges and the fact that the edge metal is not surrounded by cooler metal. The tendency to fall away may be offset by the use of the dams 29 and 30 described in connection with FIG. 11. However, the current will still be relatively concentrated at the edges and may melt metal below the dams 29 and 30 or the metal at the edges may be heated to a temperature higher than the temperature of the remaining molten metal or there may still be excessive melting at the edges which may be undesirable. As noted hereinbefore, this occurred with the embodiment shown in FIGS. 15 and 16.

Figure 19:
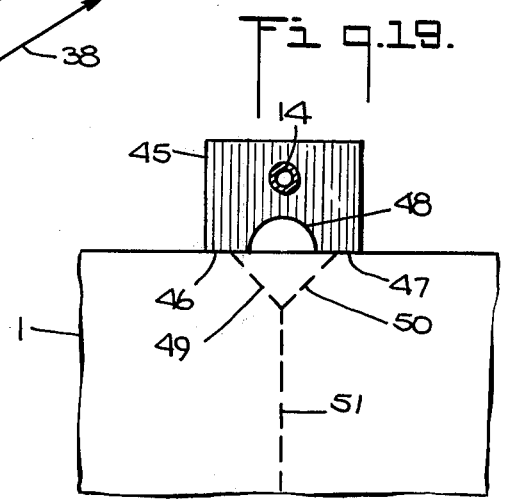
FIG. 19 is plan view illustrating the manner in which the contacts used in the apparatus of the invention may be modified to prevent undesired melting of metal immediately adjacent the contacts.

To reduce the heating at the edges, the contacts, such as the contacts 15, 17 and 15a may be formed with two contacting surfaces as illustrated in FIG. 19. As shown therein, the contact 45, which may be connected to the conductor 14 or the conductor 19, or similar contacts 45 may be used for both the contacts 15 or 15a and 17, has a pair of surfaces 46 and 47 with contact and supply current to the part 1. The surfaces are spaced by a groove 48, and current flows from the surfaces 46 and 47 along two paths 49 and 50 before joining in a single path 51. Thus, the current is not as concentrated at the edge of the part 1 as it is along the path 51. The spacing between the surfaces 46 and 47 depends upon the operating conditions and the results desired but may, for example, be of the order of one-sixteenth inch.

Of course, if melting occurs too close to the contacts in the other embodiments of the invention, the contacts may be provided with a pair of spaced contacting surfaces as illustrated in FIG. 19.

It is also known in the art that metal can be melted by means of electric current induced therein with the use of an induction coil connected to a high frequency current source. See, for example, U.S. Pat. No. 3,872,275. When current is induced in a metal part by an induction coil, many of the effects which occur when the current is caused to flow in the metal part by means of contacts and a proximity conductor and which are described hereinbefore also occur. Thus, the reference depth of the current in the part and the effective resistance of the current path are the same as described. Heat is transferred in the metal part by conduction in the same manner as it is when contacts and a proximity conductor are used. Since the current flows in the metal part in the direction opposite to the current flow in the induction coil, the latter acts like a proximity conductor in that the major current in the part follows a path underlying the adjacent conductor of the coil as closely as possible and the width of the path depends upon the width of such conductor and its spacing with respect to the part.

However, with an induction coil, the induced current must flow in a closed path whereas with contacts and a proximity conductor, the current in the part flows from contact to contact underneath the proximity conductor. Therefore, when an induction coil is used, melting of metal will occur at places on the part where melting is not desired unless the area to contain the particles is also in the shape of a closed path. In the latter case, an induction coil may be used to melt the metal prior to embedment of the particles therein.

Figure 20:
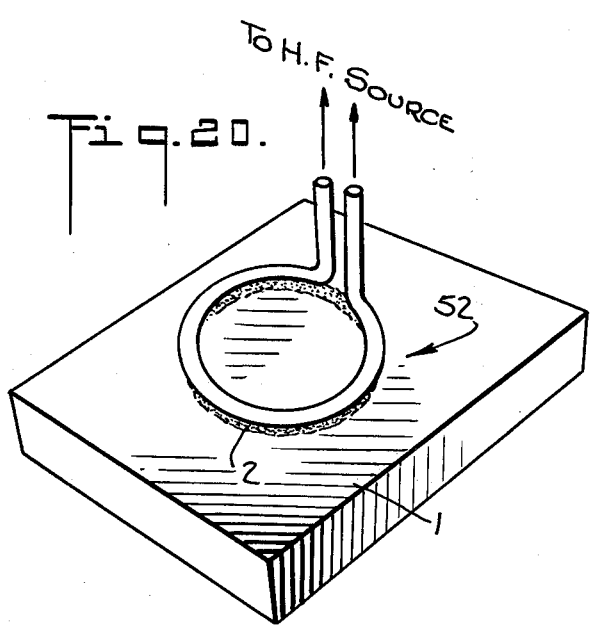
FIGS. 20 and 21 are respectively perspective and cross-sectional view of embodiments of the invention using an induction coil to melt the metal in which the particles are to be embedded.

FIG. 20 illustrates the use of a single turn induction coil 52 to melt a circular area underlying particles 2 which are to be embedded in the area as described in connection with the embodiments previously set forth. Thus, by selecting the frequency, magnitude and duration of the current and the width and spacing of the coil 52 with respect to the surface of the part 1 as described in connection with the previous embodiments, a circular area of the desired size and depth may be melted and the particles 2 may be embedded therein. As in the previous embodiments, the metal is cooled so that at least most of the added particles 2 continue to exist after the molten metal has solidified.

Figure 21:
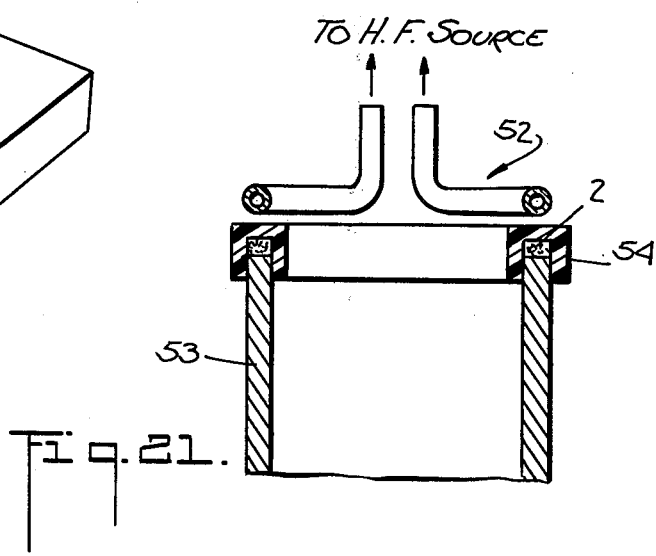

FIG. 21 illustrates a similar use of the induction coil 52 to embed particles 2 in the end face of a hollow cylinder or tube 53. During the heating of the metal of the end face of the tube 53 to at least its melting temperature, the particles 2 may be held in place by a ring 54 of high temperature resisting, insulating material, such as silicon nitride, and if desired or necessary, the particles 2 may be pressed into the molten metal by means of the ring 54.

In the embodiments illustrated in FIGS. 20 and 21, the coil 52 overlies substantially the entire area to be melted and the portion of the coil 52 adjacent the surface of the area has substantially the shape of the area and is spaced from the surface of the area by not more than five times, and preferably, not more than two times the width thereof (diameter in this case) in a direction substantially parallel to the surface of the metal part. Of course, the area to be melted may be non-circular or irregular and the coil 52 may be correspondingly shaped.

Although preferred embodiments of the present invention have been described and illustrated, it will be apparent to those skilled in the art that various modifications may be made without departing from the principles of the invention.

What is claimed is:

1. A method of embedding a plurality of discrete particles in a surface area of a structurally continuous metal part, said particles being particles of a material having a melting point higher than, and mechanical properties different from, the metal of said part, said method comprising:

contacting said metal part with a first contact means at one end of said area and with a second contact means at the opposite end of said area thereby to define the length of said area, the dimension of said area in the plane of said surface and perpendicular to the length of the area being the width dimension of said area;

rapidly heating the metal of said area at least to the melting temperature thereof by supplying electric current having a frequency of at least 3000 Hz to both said contact means, and hence, to said metal part, the current being supplied to at least one of said contact means through relatively long and narrow proximity conductor means which overlies substantially the length of said area between said contacts with the length thereof extending parallel to the length of said area, which is spaced from the surface of said area by not more than five times the width of said proximity conductor means in the direction substantially parallel to the surface of said area and perpendicular to said length of said area and which is connected to said contact means so that the current therein, at any instant, flows oppositely to the flow of current in said metal part to cause the current to concentrate in said area as close as possible to said conductor and thereby melt metal in said area having a width approximating the width of said conductor without melting metal of the part outside of such melted metal;

inserting said particles of said material into the metal of said area while it is molten; and cooling said metal to thereby form an area at the surface of said metal part which comprises discrete particles of said material embedded in a solid matrix of said metal, said cooling being caused before most of said particles can completely melt and so that at least most of the added particles continue to exist even though surface portions thereof may have melted.

2. A method set forth in claim 1 wherein the metal of said area is heated to a temperature above the melting temperature of said metal but below the melting temperature of said particles.

3. A method as set forth in claim 1 wherein the metal of said area is heated to a temperature above the melting temperature of said metal and above the melting temperature of at least portions of said particles to bond said particles to said part by an alloy of the material of said particles and metal of said part.

4. A method as set forth in claim 1 wherein the cross-sectional size of said particles is not greater than 0.1 inches.

5. A method as set forth in claim 4 wherein the size of said particles is in the range from 50 to 300 mesh.

6. A method as set forth in claim 1 wherein said material is a material which is harder than the metal of said part selected from the group consisting of tungsten, tungsten carbide, tungsten carbide with a cobalt matrix, alumina, silicon nitride, silicon carbide, boron carbide, iron, aluminum and diamond bort and mixtures thereof.

7. A method as set forth in claim 6 wherein the metal of said part is a metal selected from the group consisting of steel, lead, silicon, nickel, copper, aluminum and bronze.

8. A method as set forth in claim 1 wherein the molten metal is cooled by directing a cooling fluid thereon after the current is discontinued.

9. A method as set forth in claim 1 wherein the molten metal is cooled by discontinuing the current before the metal adjacent the molten metal reaches a temperature which would prevent self-quenching of the molten metal by conduction of heat to the adjacent metal.

10. A method as set forth in claim 1 in which the metal of said area is heated in an atmosphere of an inert gas.

11. A method as set forth in claim 1 in which the metal of said area is heated in an atmosphere of a reducing gas.

12. A method as set forth in claim 1 wherein said particles are deposited on said area prior to the heating of the metal of said area.

13. A method as set forth in claim 12 wherein said particles are inserted into the molten metal of said area by pressing them therein.

14. A method as set forth in claim 12 further comprising confining said particles to said area with an insulating member pressing said articles toward said area during the heating of said area.

15. A method as set forth in claim 1 further comprising producing relative movement between said part, on the one hand, and the contact means and said proximity conductor means, on the other hand, in a direction transverse to said length of said area, inserting said particles and successively similarly heating, and cooling at least one further area of said metal.

16. A method as set forth in claim 15 wherein said part is moved step-wise and said current is discontinued before each step.

17. A method as set forth in claim 15 wherein said part is moved continuously with the contacts in contact with the metal part and said current is interrupted as the metal of said area reaches said temperature to which it is to be heated.

18. A method as set forth in claim 15 wherein said current is supplied to said contact means continuously and said part is moved with the contacts in contact with the metal part to interrupt the supply of current to said area as the metal of said area reaches said temperature to which it is to be heated.

19. A method as set forth in claim 1 further comprising producing relative movement between said part, on the one hand, and the contact means and said proximity conductor means, on the other hand, in the direction of said length of said area during the heating of said area.

20. A method as set forth in claim 19 wherein said part is continuously moved, said current is continuously supplied to said contact means and said particles are continuously supplied to the surface of the molten metal.

21. A method as set forth in claim 20 further comprising pressing said particles into the metal of said area after the particles have been supplied to the surface of said molten metal.

22. A method as set forth in claim 1 wherein said proximity conductor means comprises a pair of conductors and wherein said pair of conductors are positioned so that, together, they overlie substantially the full length of said area and one of said conductors is connected to said first contact means and the other of said conductors is connected to said second contact means.

23. A method as set forth in claim 1 wherein said proximity conductor means is a single conductor connected to said first contact and is positioned to overlie the full length of said area.

24. A method as set forth in claim 1 further comprising reducing the heating of the metal adjacent at least one of said contact means by supplying said current to said part through a pair of spaced surfaces on said one contact means engaging said part so that the current follows a pair of paths adjacent said one contact means.

25. A method as set forth in claim 1 wherein said current has a frequency of at least 50 KHz, the duration of said current is less than one second, the magnitude of said current is such as to produce a power density of at least 20 kilowatts per square centimeter, the width of said proximity conductor is less than one-half inch and the spacing between said proximity conductor and said surface of said area is less than two times said width of said proximity conductor.

26. A method as set forth in claim 1 further comprising varying the magnitude of said current during the heating of said metal of said area.

27. A method of embedding a plurality of discrete particles in a surface area of a metal part, said particles being particles of a material having a melting point higher than, and mechanical properties different from, the metal of said part, said method comprising:
   contacting said metal part with a first contact means at one end of said area and with a second contact means at the opposite end of said area thereby to define the length of said area;
   rapidly heating the metal of said area at least to the melting temperature thereof by supplying electric current having a frequency of at least 3000 Hz to both said contact means, and hence, to said metal part, through proximity conductor means which overlies substantially the length of said area between said contacts, which is spaced from the surface of said area by not more than five times the width of said proximity conductor means in the direction substantially parallel to the surface of said area and perpendicular to said length of said area and which is connected to said contact means so that the current therein, at any instant, flows oppositely to the flow of current in said metal part, the heating of the metal along the length of said area being varied to provide spaced lengths of molten metal;
   inserting said particles of said material into said spaced lengths of molten metal of said area while they are molten; and
   cooling said metal to thereby form spaced lengths of metal at the surface of said metal part which comprises discrete particles of said material embedded in a solid matrix of said metal, said cooling being caused before most of said particles can completely melt and so that at least most of the added particles continue to exist even though surface portions thereof may have melted.

28. A method of embedding a plurality of discrete particles in a surface area of a structually continuous metal part, said particles being particles of a material having a melting point higher than, and mechanical properties different from, the metal of said part, said method comprising:
   heating of the metal of said area of said surface to at least its melting temperature without heating adjacent metal to its melting temperature with said part positioned so that said area is uppermost and the molten metal of said area cannot flow away from said area due to the force of gravity, said heating being produced by causing an electric current having a frequency of at least 3000 Hz to flow in said area while causing a current of the same frequency to flow in a relatively long and narrow conductor overlying said area but which, at any instant, flows oppositely to the direction of the current flow in said area said conductor being spaced from the surface of said area by not more than five times the width of said conductor in a direction substantially parallel to said surface to cause the current to concentrate in said area as close as possible to said conductor and thereby melt metal in said area having dimensions approximating the dimensions of the portion of said conductor overlying said area without melting metal of the part adjacent to such melted metal;
   inserting said particles of said material into the metal of said area while it is molten;
   cooling the metal of said area to thereby form an area at the surface of said metal part which comprises discrete particles of said material embedded in a solid matrix of metal, said cooling being caused before most of said particles can completely melt and so that at least most of the added particles continue to exist even though surface portions thereof may have melted.

29. A method as set forth in claim 28 wherein said current is caused to flow in said area by contacting said part with contacts respectively contacting the surface of the metal part at opposite ends of said area and connected to a source of said current, at least one of said contacts being connected to said source in series with said conductor.

30. A method as set forth in claim 28 wherein said area has the shape of a closed path and said conductor is a conductor of an induction coil connected to a source of said currents, said conductor having substantially the shape of said path.

31. A method as set forth in claim 1 wherein said proximity conductor means has a width less than the width of the surface of said part which includes said area.

32. A method as set forth in claim 28 wherein said conductor has a width less than the width of the surface of said part which includes said area.

33. A method as set forth in claim 32 wherein said heating is varied by varying the shape of said proximity conductor means which overlies said area.

34. A method as set forth in claim 32 wherein said heating is varied by placing metal having an electrical conductivity higher than the electrical conductivity of the metal of said part on and in contact with said metal intermediate the places where said lengths of metal are to be provided prior to supplying current to said area.

* * * * *